United States Patent [19]

Murphy

[11] Patent Number: 5,244,581
[45] Date of Patent: Sep. 14, 1993

[54] CHEMICAL PROCESS FOR THE CATALYTIC OXIDATION OF FORMALDEHYDE AND OTHER ORGANIC COMPOUNDS

[75] Inventor: Andrew P. Murphy, Littleton, Colo.

[73] Assignee: The United States of America as represented by the Secretary of the Interior, Washington, D.C.

[21] Appl. No.: 925,850

[22] Filed: Aug. 7, 1992

Related U.S. Application Data

[63] Continuation of Ser. No. 738,411, Jul. 31, 1991, abandoned.

[51] Int. Cl.$^5$ .............................................. C02F 1/58
[52] U.S. Cl. ..................... 210/756; 210/763; 210/908
[58] Field of Search ............... 210/762, 763, 908, 909, 210/754–756

[56] References Cited

U.S. PATENT DOCUMENTS

| | | | |
|---|---|---|---|
| 3,965,249 | 6/1976 | Kinosz | 210/763 |
| 4,297,333 | 10/1981 | Crawford et al. | 210/763 |
| 4,732,688 | 3/1988 | Bryan et al. | 210/763 |
| 4,764,286 | 8/1988 | Bon et al. | 210/763 |

*Primary Examiner*—Thomas Wyse
*Attorney, Agent, or Firm*—E. Philip Koltos

[57] ABSTRACT

A chemical process for the catalytic oxidation of formaldehyde and other organic compounds contained in a dilute aqueous solution, particularly waste water. The inventive feature resides in the use of a cobalt catalyst, at ambient temperature, at a pH of 5.5, to increase the rate of oxidation of the organic compounds when hypochlorous acid is the oxidant. The latter may be provided by a chlorine compound, such as sodium hypochlorate, calcium hypochlorite or chlorine gas dissolved in water.

4 Claims, No Drawings

CHEMICAL PROCESS FOR THE CATALYTIC OXIDATION OF FORMALDEHYDE AND OTHER ORGANIC COMPOUNDS

CROSS REFERENCE TO RELATED APPLICATION

This application is a continuation of my prior patent application Ser. No. 07/738,411, filed Jul. 31, 1991, now abandoned.

BACKGROUND OF THE INVENTION

1. Field of the Invention

The invention relates to the catalytic oxidation of dilute aqueous organic compounds, and particularly, to the catalytic oxidation of dilute aqueous compounds with hypochlorous acid. More particularly, the invention relates to the catalytic oxidation of dilute aqueous formaldehyde with hypochlorous acid.

2. Prior Art of Interest

Past practices relating to water treatment for the purpose of rendering innocuous formaldehyde and other organic compounds by oxidation or otherwise have been accompanied by a number of disadvantages.

Moses et al, Canadian Patent No. 539,300 (1957), discloses a water treatment process which achieves oxidation of organic compounds by introducing oxygen to a waste stream in the presence of a platinum catalyst, the waste stream being heated to a temperature in the range of 100 to 350 degrees Centigrade at a pressure of 200 to 2500 psi. The primary disadvantage of this process is the high cost of heating and pressurizing the waste stream. The use of a platinum catalyst is an additional factor.

Various biological processes are available which utilize formaldehyde and other organic compounds as nutrients. Such processes require long reaction times and therefore large holding tanks, a significant cost factor.

Junkermann et al, U.S. Pat. No.4,104,162, discloses a method for oxidizing formaldehyde in aqueous streams by the addition of hydrogen peroxide and sodium hydroxide. This method is attended by multiple disadvantages including the high cost of hydrogen peroxide and photodegradation upon exposure to light, incompleteness of formaldehyde oxidation after considerable reaction time, and the presence of a potential disposal problem in light of such reaction products as formate and hydrogen gas.

Murphy et al, Environmental Science Technology, Vol. 23, pp. 166-169 (1989), disclose a water treatment process wherein formaldehyde is oxidized by hydrogen peroxide in the presence of ferric chloride as a catalyst. Disadvantages of this process, common to the Junkermann et al process, are the high cost of hydrogen peroxide relative to chlorine, sodium hypochlorite or calcium hypochlorite, and the requirement of greater than stoichiometric amounts of hydrogen peroxide to compensate for autodecomposition of the oxidant. Actual requirements for hydrogen peroxide may be 3 to 5 times the quantity based on reaction stoichiometry. Associated costs would be significant.

SUMMARY OF THE INVENTION

The present invention is directed to the catalytic oxidation of formaldehyde and other organic compounds contained in a dilute aqueous solution and is particularly adapted to waste water treatment. The inventive feature resides in the use of a cobalt catalyst to increase the rate of oxidation of the organic compounds when hypochlorous acid is employed as an oxidant. The hypochlorous acid required for the reaction may be provided by a chlorine compound, such as sodium hypochlorite, calcium hypochlorite or chlorine gas, dissolved in water. The cobalt is an oxide of cobalt, probably $CoO_2 \cdot xH_2O$, which results from the reaction of almost any cobaltous or cobaltic salt or cobalt metal added to the solution. Practice of the invention is unattended by the disadvantages of current practices in that oxidation proceeds rapidly at room temperature using stoichiometric quantities of oxidant and without appreciable concentrations of formate or hydrogen gas or the need for large tanks.

DETAILED DESCRIPTION OF THE INVENTION AND PREFERRED EMBODIMENT

As indicated heretofore, the invention uses a cobalt catalyst to increase the rate of formaldehyde oxidation with hypochlorous acid. The catalyst is an oxide of cobalt, (probably $CoO_2 \cdot xH_2O$) which is formed by the action of NaOCl. After filtering the process effluent, the catalyst remains behind as a solid. Chemical analysis at the mg/l level shows that almost no catalyst is lost to the effluent. The reaction requires only a stoichiometric amount of hypochlorous acid and the following balanced equation can be written:

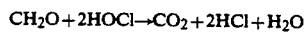

$$CH_2O + 2HOCl \rightarrow CO_2 + 2HCl + H_2O$$

The cobalt salt is a "true" catalyst showing repeated cycles of oxidation with the original cobalt salt used over again.

The operating pH for the oxidation process is on the acid side of the pH scale. The species of chlorine in water are a function of pH. At a pH of 5.5, all the chlorine is present as hypochlorous acid. Because hypochlorous acid is the oxidant in this process, the ideal pH for operation is 5.5.

In the following examples, intended to demonstrate the advantages of the present invention, all formaldehyde oxidation data was generated using $^{14}C$ labeled $CH_2O$.

EXAMPLE 1

Increased Rate of Oxidation with Cobalt Catalyst

Approximately 10 ml of 5000 mg/l formaldehyde was added to 90 ml of deionized water in a beaker. There was then added 1 ml of 8.5% Co stock solution (salt used to make up stock was $CoCl_2$) and 10 ml of 5% NaOCL. The pH was then adjusted and maintained at a value of 5.5 with an autotitrator; 5 ml samples of reaction slurry were taken up at time intervals with a syringe, the slurry was filtered through a 0.45 micron membrane, and exactly 1.0 ml of filtrate was pipeted into a scintillation vial; 0.1 ml of 12M HCl was added to the vial to remove carbonate species as $CO_2$ gas and 10 ml of scintillation cocktail was then added. A scintillation counter was then used to determine the percentage of $^{14}C$ present in each sample. The entire procedure with the exception of the additional of cobalt was repeated exactly for purposes of comparison. The data obtained is provided in Table 1:

TABLE 1

| Time (min) | Carbon Content (calculated as mg/l $CH_2O$) | |
|---|---|---|
| | Sample with Co | Sample without Co |
| 0 | 500 | 500 |
| 0.5 | 207 | — |
| 1.0 | 160 | — |
| 2.0 | 108 | — |
| 3.0 | 84 | — |
| 4.0 | 72 | — |
| 5.0 | 62 | — |
| 10.0 | 47 | 456 |
| 50.0 | — | 448 |
| 150.0 | — | 378 |
| 480.0 | — | 310 |
| 1260.0 | — | 220 |

EXAMPLE 2

Reaction Stoichiometry

Identical procedures were followed as in Example 1 except for the following: only 0.1 ml of Co stock solution was used, the amounts of NaOCl used were varied, and a three hour waiting period preceded sampling. The date obtained is set forth in Table 2.

TABLE 2

| Sample # | NaOCl (ml of 5% soln) | (mmole) | $CH_2O$ Oxidized to $CO_2$ (mmole) |
|---|---|---|---|
| 1 | 0 | 0 | 0 |
| 2 | 0.5 | 0.336 | 0.197 |
| 3 | 1.0 | 0.672 | 0.417 |
| 4 | 2.0 | 1.34 | 0.700 |
| 5 | 3.0 | 2.02 | 0.937 |
| 6 | 4.0 | 2.69 | 1.24 |
| 7 | 5.0 | 3.36 | 1.63 |

It is observed from Table 2 that the ratio of NaOCl consumed to $CH_2O$ oxidized to $CO_2$ is 1.9 plus or minus 0.2, which establishes a reaction stoichiometry of 2.

EXAMPLE 3

No Catalyst Lost to Effluent

Inductively Coupled Plasma (ICP) analysis for cobalt on 0.45 micron filtered effluent from cobalt containing samples in Example 1 was less than 1 mg/l.

EXAMPLE 4

Cobalt Salt is "True" Catalyst 10 ml of 5000 mg/l formaldehyde was added to 90 ml of deionized water in a beaker. 1.0 ml of 8.5% cobalt stock solution and 5 ml of 5% NAOCl were added to the beaker. The reaction mixture was immediately sampled for $^{14}C$ as in Example 1. The reaction was allowed to proceed for 5 minutes and the mixture was again sampled for $^{14}C$. 10 ml of 5000 mg/l formaldehyde and 5 ml of 5% NaOCl were then added to the reaction mixture and the mixture was immediately sampled for $^{14}C$. These last two sampling steps were repeated four times. The data from this experiment is provided in Table 3.

TABLE 3

| Cycle | Initial $CH_2O$ | Final $CH_2O$ | $CH_2O$ Oxidized to $CO_2$ (mg) |
|---|---|---|---|
| 0 | 500 | 316 | 18.4 |
| 1 | 653 | 368 | 28.5 |
| 2 | 654 | 396 | 25.8 |
| 3 | 752 | 435 | 31.7 |
| 4 | 820 | 500 | 32.2 |

The data in Table 3 demonstrates that formaldehyde continues to be oxidized at an accelerated rate with the original cobalt salt added. Thus, cobalt salt can be considered an heterogeneous catalyst for formaldehyde oxidation with hypochlorous acid.

Data presented in the examples are at ambient temperatures (20°–25°C.). Many processes require elevated temperatures to achieve the desired oxidation of organics in a reasonable time frame. It is important that the process operates efficiently at ambient temperatures due to the added energy costs of having to heat a waste stream. For most applications, oxidations using this process can be expected to proceed at room temperature.

While the oxidation medium of the invention has been specifically disclosed with respect to formaldehyde, it is contemplated that it might be useful for the oxidation of other organics, such as alcohols, phenols, ethers, aldehydes, ketones, carboxylic acids, amides, esters, amines, carbohydrates, and halogen compounds.

The cobalt employed in the practice of the invention can be almost any $Co^{++}$ or $Co^{+++}$ salt or even cobalt metal because the NaOCl will oxidize these substances to the catalytic oxide of cobalt, presumably $CoO_2 \cdot xH_2O$.

It is also contemplated that organic laden waters mixed with sodium hypochlorite could be pumped through a column containing the catalyst in powdered form. Larger particles of the oxidant may be preferred to achieve faster settling rates, while fine particles may be preferred to provide greater surface and achieve faster reaction rates. It is further contemplated that the catalyst may be coated on the surface of a non-reactive material and continue to show catalytic properties when brought in contact with the solution.

Additional embodiments and advantages within the scope of the claimed invention will be apparent to those skilled in the art.

What is claimed is:

1. In a chemical process for the treatment of waste water with a chlorine compound in the presence of a cobalt catalyst to oxidize formaldehyde, the improvement wherein said cobalt catalyst is exclusively an oxide of cobalt and, carrying out said treatment at ambient temperature and at a pH such that the chlorine from said chlorine compound is present essentially in the form of hypochlorous acid.

2. A process according to claim 1, wherein said hypochlorous acid is present in a stoichiometric amount.

3. A process according to claim 1 wherein the molar ratio of hypochlorous acid to formaldehyde is 2.

4. A process according to claim 1 wherein said treatment is carried out at a pH of 5.5.

* * * * *